Jan. 3, 1933.     C. A. HERBERTS     1,893,080
SPINDLE SHAPER
Filed May 16, 1932

INVENTOR
C. A. HERBERTS
BY Hazard and Miller
ATTORNEYS

Patented Jan. 3, 1933

1,893,080

UNITED STATES PATENT OFFICE

CURTIS A. HERBERTS, OF LOS ANGELES, CALIFORNIA

SPINDLE SHAPER

Application filed May 16, 1932. Serial No. 611,589.

This invention relates to improvements in wood working devices and particularly to those devices commonly referred to in the art as spindle shapers.

An object of the invention is to provide an improved spindle shaper having a vertically disposed spindle, which is suitably driven and which carries a cutter. The spindle is surrounded by a suitable table which in various operations must be adjusted toward or away from the cutter on the spindle.

It is an object of the present invention to provide an improved form of construction facilitating easy adjustment of the table relatively to the cutter.

Another object of the invention is to provide a spindle shaper having the above mentioned characteristics and which has a suitable scale conveniently located which will facilitate the proper positioning of the table relatively to the cutter.

With the foregoing and other objects in view, which will be made manifest in the following detailed description, and specifically pointed out in the appended claims, reference is had to the accompanying drawing for an illustrative embodiment of the invention, wherein:

Figure 1:
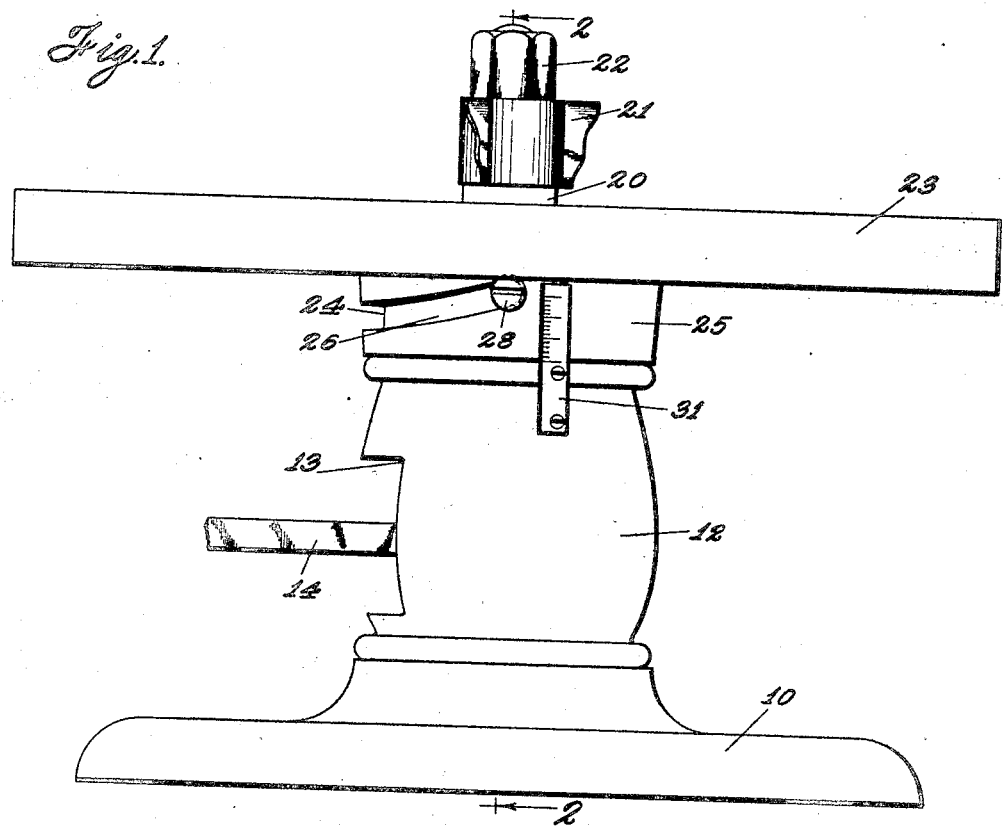
Fig. 1 is a view in side elevation of the improved spindle shaper.
Figure 2:
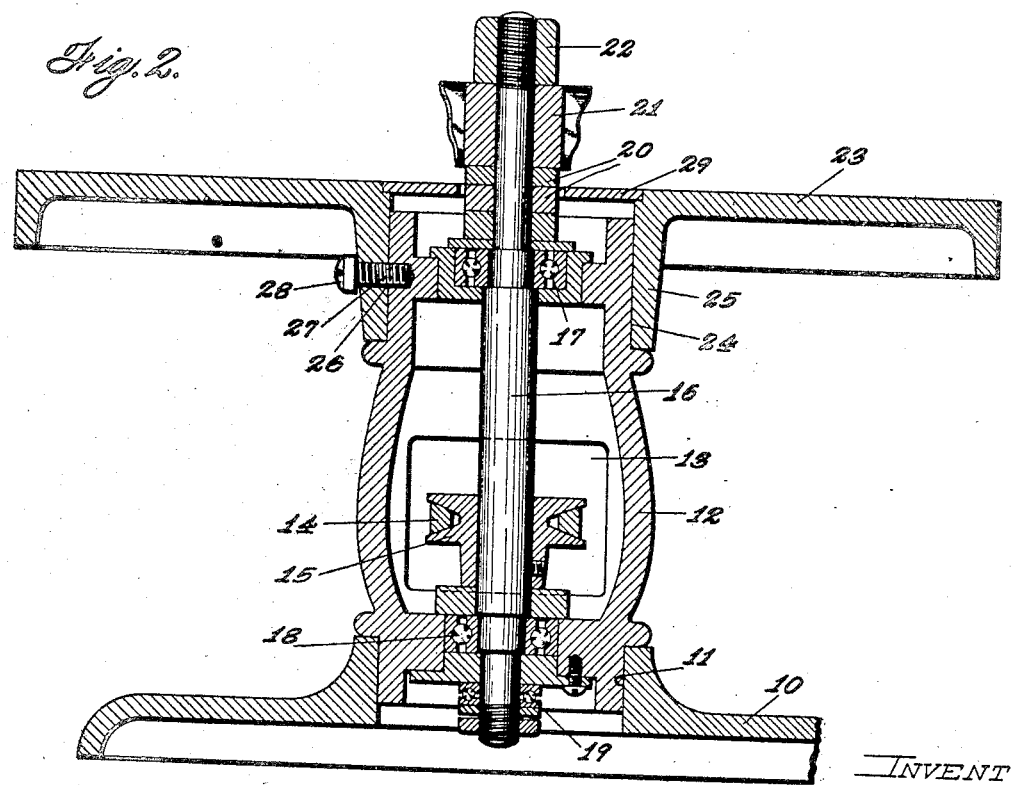
Fig. 2 is a vertical section taken substantially upon the line 2—2 upon Figure 1.

Referring to the accompanying drawing, wherein similar reference characters designate similar parts throughout, the improved spindle shaper comprises a base 10 having a central aperture 11 which receives the bottom of a body 12. An opening 13 is formed in the body for a power driven belt 14. This belt passes over a pulley 15 which is mounted on a vertical spindle 16. The spindle 16 is mounted in upper and lower antifriction bearings 17 and 18 respectively and is preferably provided with a thrust bearing 19 at its bottom. The details of construction for mounting the spindle in the body may vary, the above described construction being merely preferable. At the top of the spindle there are collars 20 and a cutter 21 held on the spindle by a nut 22. The threads on the nut and spindle are preferably left hand threads. The blades of the cutter 21 are so formed as to give the wood the desired shape and it is obvious that different forms of cutters may be used to replace the cutter shown. Surrounding the upper end of the spindle there is a table 23 and, as hereinbefore set forth, the invention concerns a construction which will enable adjustment of the table relatively to cutter 21. To this end, the upper end of the body 12 is cylindrically formed as indicated at 24 and the table 23 has a hub portion 25 the interior of which is also cylindrical so that it fits snugly about the top of the body with a close running fit. The hub portion 25 has a helical slot 26 formed therein and a cap screw 27 is threaded into the cylindrical portion of body 12 through the slot 26. This cap screw has a head 28 which can be tightened down against the exterior of the hub. The reference character 29 indicates a cover plate recessed in the top of the table and fitting about the collars to prevent shavings and cuttings from dropping into the body. On the side of the body there is secured a small scale 31 which extends upwardly over the hub portion 25 of the table. Preferably the lowermost graduation on the scale is even with the bottom of hub portion 25 so that the position of the bottom of the hub can be read on the scale.

The operation and advantages of the improved construction are as follows. When it is desired to elevate the table from the position shown, this can be accomplished by loosening cap screw 27 and rotating the table 23. The helical slot 26, which remains in engagement with the screw 27, causes the table to lift during this rotation. The amount of lift can be readily read on scale 31 and when the table has been elevated to the desired position it will automatically remain in this position upon release. The pitch of slot 26 is so slight that the table will not reversely rotate due to gravity. However, in order to lock the table in elevated position the cap screw can be tightened against the outside of hub 25, thus frictionally holding the table in the elevated adjusted position. By having a close running fit between the cylindrical surfaces on the exterior of the body 12 and on the interior of hub 25, the table will always be maintained with its top surface in a plane perpendicular to the axis of the spindle. Adjustment of the table in no way causes the table to become loose on the body but instead it serves as a firm support or foundation over which the wood may be passed on being cut by the cutter. Any suitable fences may be mounted on the table to facilitate the guiding of the wood as it passes by cutter 21.

From the above described construction it will be appreciated that although the improved spindle shaper is of very simple construction yet it is very sturdy and durable. Adjustment of the table in no way involves loosening or wobbling of the table relatively to the support or body.

Various changes may be made in the details of construction without departing from the spirit or scope of the invention as defined by the appended claims.

I claim:

1. A spindle shaper comprising a body having an upper cylindrical portion, a spindle rotatably mounted upon the body, means for rotating the spindle, a cutter mounted upon the spindle, a table surrounding the spindle having a hub portion fitting about the cylindrical portion of the body, there being a helical slot formed in the hub portion, and a screw threaded into the cylindrical portion of the body through the slot having a head adapted to be tightened down against the hub portion whereby when the screw is loose on rotating the table the position of its top surface with respect to the cutter on the spindle may be adjusted and on tightening the screw the table may be fastened in adjusted position.

2. A spindle shaper comprising a body having an upper cylindrical portion, a spindle rotatably mounted upon the body, means for rotating the spindle, a cutter mounted upon the spindle, a table surrounding the spindle having a hub portion fitting about the cylindrical portion of the body, there being a helical slot formed in the hub portion, a screw threaded into the cylindrical portion of the body through the slot having a head adapted to be tightened down against the hub portion whereby when the screw is loose on rotating the table the position of its top surface with respect to the cutter on the spindle may be adjusted and on tightening the screw the table may be fastened in adjusted position, and a scale secured to the body having a portion extending upwardly over the hub portion of the table for ascertaining the position of the top of the table relatively to the cutter.

In testimony whereof I have signed my name to this specification.

CURTIS A. HERBERTS.